(12) United States Patent
Roscoe et al.

(10) Patent No.: US 8,230,229 B2
(45) Date of Patent: Jul. 24, 2012

(54) SECURITY IN COMPUTING NETWORKS

(75) Inventors: Andrew William Roscoe, Oxford (GB);
Long Hoang Nguyen, Oxford (GB)

(73) Assignee: ISIS Innovation Limited, Oxford (GB)

( * ) Notice: Subject to any disclaimer, the term of this patent is extended or adjusted under 35 U.S.C. 154(b) by 741 days.

(21) Appl. No.: 12/084,412

(22) PCT Filed: Nov. 3, 2006

(86) PCT No.: PCT/GB2006/004113
§ 371 (c)(1),
(2), (4) Date: Jan. 27, 2009

(87) PCT Pub. No.: WO2007/052045
PCT Pub. Date: May 10, 2007

(65) Prior Publication Data
US 2009/0313475 A1    Dec. 17, 2009

(30) Foreign Application Priority Data

Nov. 4, 2005  (GB) .................................. 0522531.3
Aug. 9, 2006  (GB) .................................. 0615773.9

(51) Int. Cl.
*H04L 29/06* (2006.01)
(52) U.S. Cl. .......................... 713/181; 713/153; 380/268
(58) Field of Classification Search .................. 713/153; 380/268
See application file for complete search history.

(56) References Cited

U.S. PATENT DOCUMENTS

| | | | |
|---|---|---|---|
| 6,804,355 B1 | 10/2004 | Graunke | |
| 7,082,449 B2 * | 7/2006 | Rarick | ........................... 708/250 |
| 7,526,088 B2 * | 4/2009 | Cordes | ............................. 380/46 |
| 2003/0206630 A1 | 11/2003 | Rarick | |

FOREIGN PATENT DOCUMENTS

EP   0 782 069   7/1997

OTHER PUBLICATIONS

Sadie Creese/Michael Goldsmith/Bill Roscoe/Ifran Zakiuddin, The Attacker in Ubiquitous Computing Environments: Formalising the Treat Model,2003 pp. 83-98.*
Sadie Creese/Michael Goldsmith/Richard Harrison/Paul Whittaker/ Bill Roscoe/Ifran Zakiuddin, Exploiting Empirical Engagement in Authentication Protocol Design, 2005 pp. 120-133.*
Creese S. et al., "The Attacker in Ubiquitous Computing Environments: Formalising the Threat Model", Proceedings of Workshop on Formal Aspects in Security and Trust, [Online], pp. 83-98, (Sep. 2003).
Creese et al., "Exploiting empirical Engagement in Authentication Protocol Design", Security in Pervasive Computing, Lecture Notes in Computer Science, vol. 3450, pp. 119-133, (Apr. 2005).
International Search Report for PCT/GB2006/004113, mailed Aug. 13, 2007.

* cited by examiner

*Primary Examiner* — Vivek Srivastava
*Assistant Examiner* — Michael D Anderson
(74) *Attorney, Agent, or Firm* — Nixon & Vanderhye PC

(57) ABSTRACT

A system for verifying the security of communications between a set of nodes via a high-bandwidth, insecure communications channel. A number of embodiments are described for enabling authenticated communication between the nodes in an environment wherein there is a high bandwidth Dolev-Yao network amongst the nodes and non-spoofable, low-bandwidth empirical channels between each pair of nodes.

35 Claims, 4 Drawing Sheets

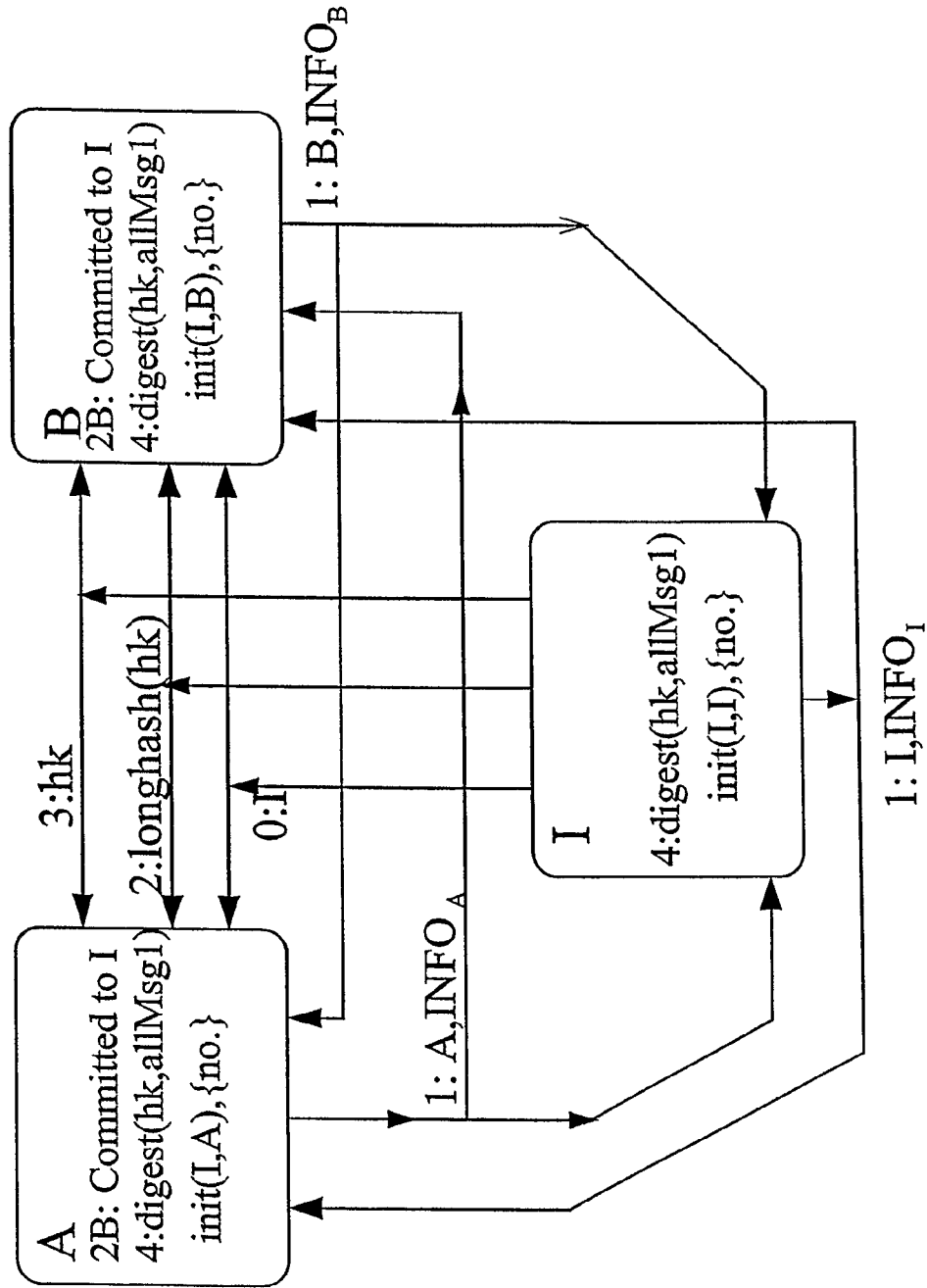

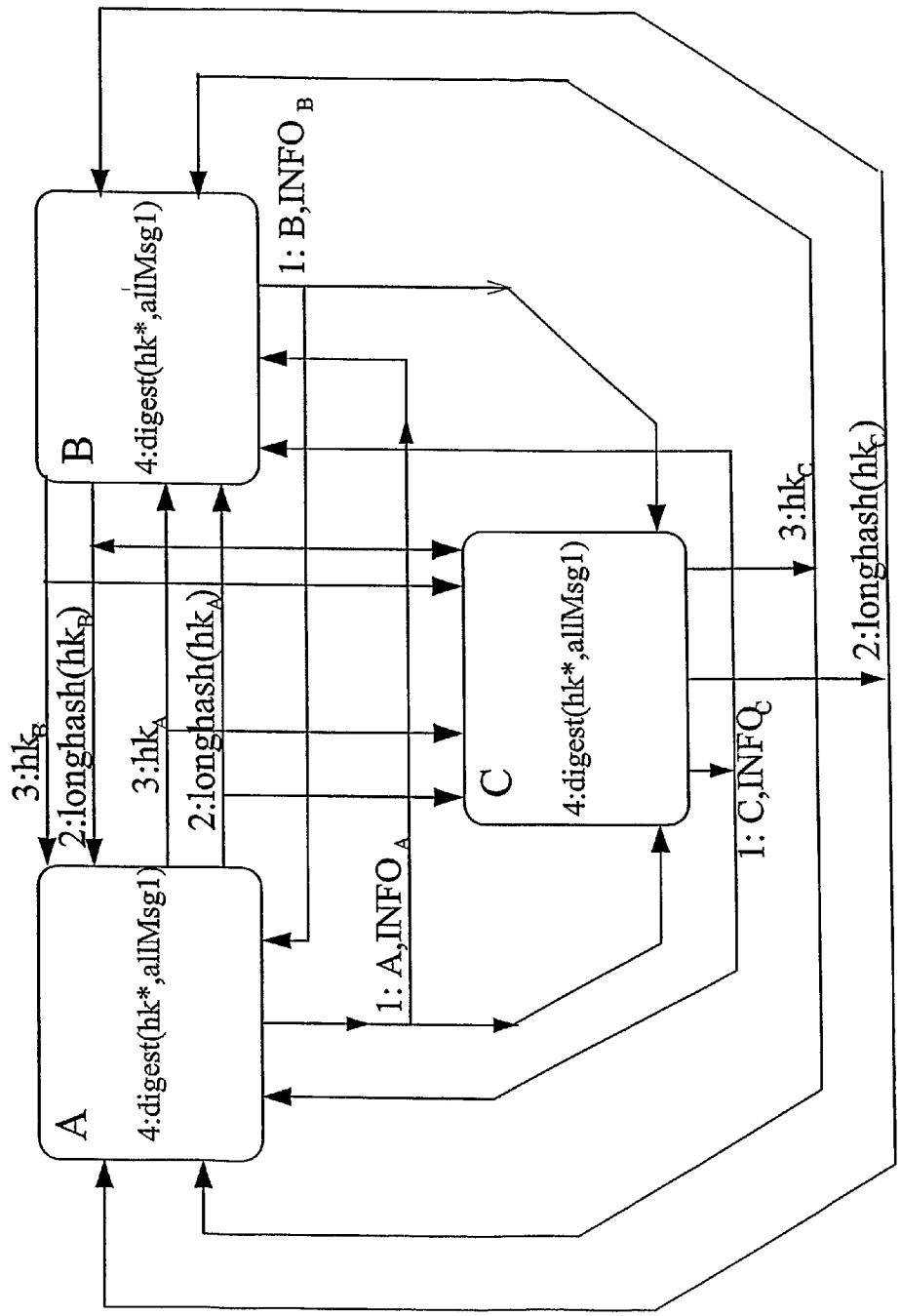
Figure 2: SHCBK

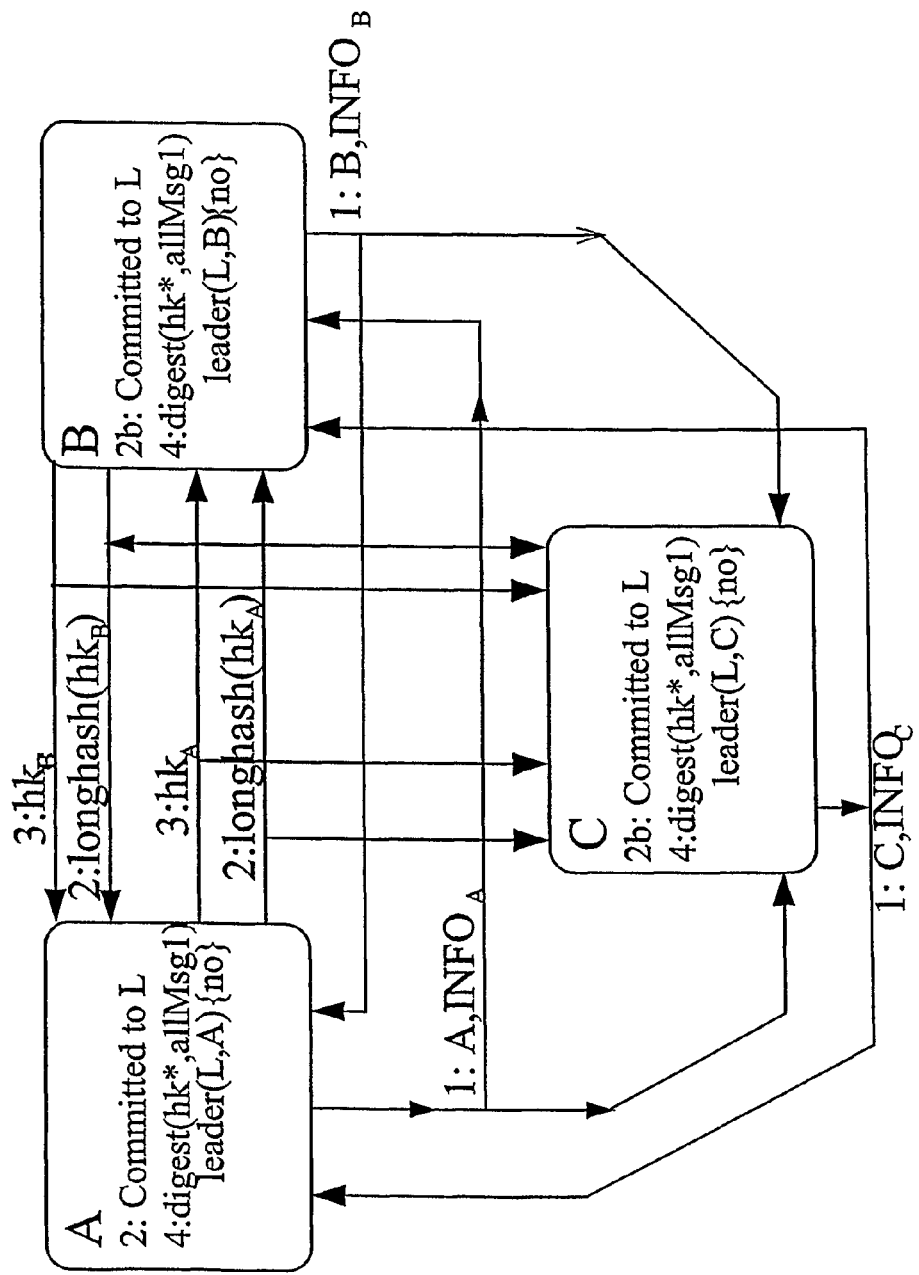
Figure 2 Hybrid case, L={A,B}

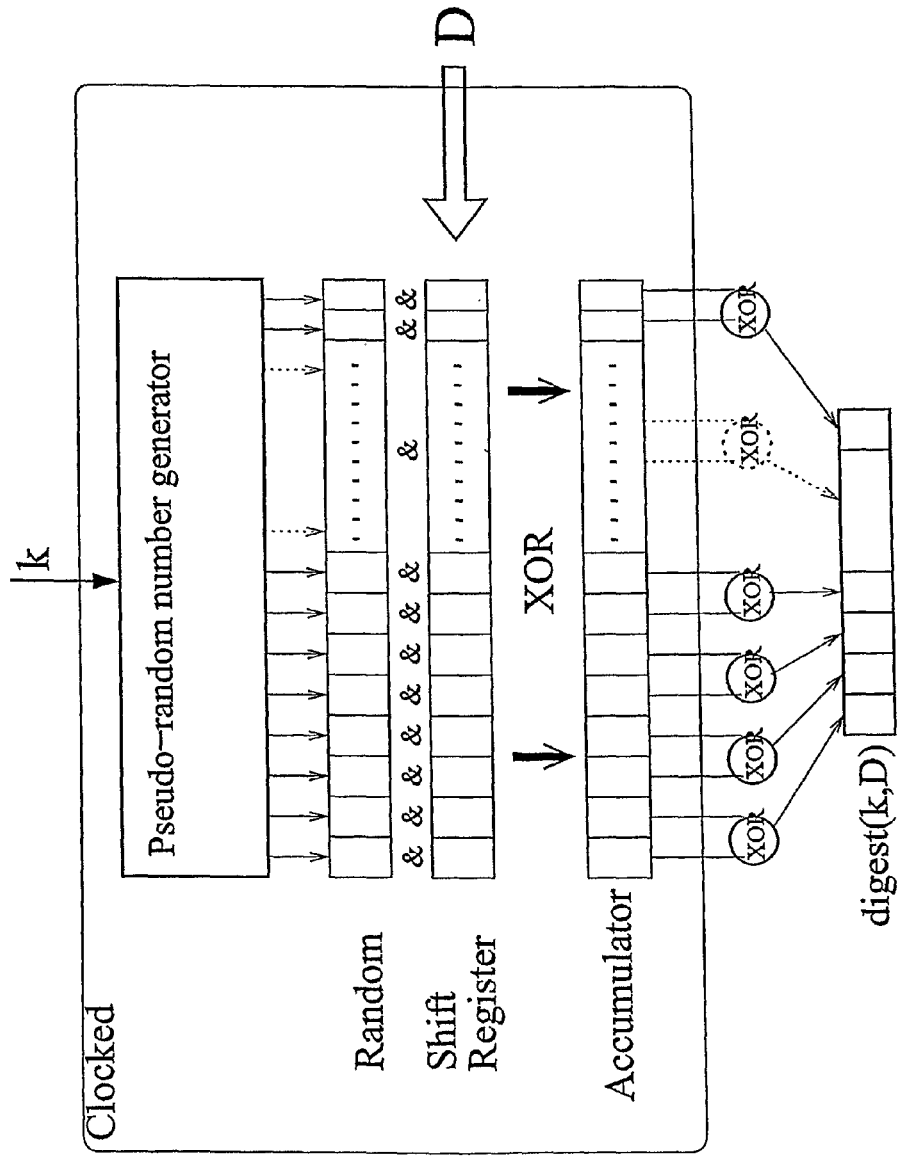
Figure 4 Exemplary hardware implementation of digest(k,D)

SECURITY IN COMPUTING NETWORKS

STATEMENT REGARDING FEDERALLY SPONSORED RESEARCH OR DEVELOPMENT

The invention referred to as Hash Commitment Before Knowledge (HCBK) protocols, and related methods, described in claims 1-18 (inclusive) of this patent application as originally filed, was made with United States Government support under grant N00014-04-1-0716. The United States Government has certain rights in the invention.

This application is the U.S. national phase of International Application No. PCT/GB2006/004113, filed 3 Nov. 2006, which designated the U.S. and claims priority to GB 0522531.3, filed 4 Nov. 2005, and GB 0615773.9, filed 9 Aug. 2006, the entire contents of each of which are hereby incorporated by reference.

This invention relates generally to security in computing networks and, more particularly to some protocols for bootstrapping security in ad hoc networks.

In the future, pervasive networking technologies will become commonplace in society and central to everyday life. The range of types of device that will interact, in the world of ubiquitous computing, is very large (from laptops to pacemakers) and, increasingly, pervasive computing highlights scenarios where users may wish to achieve some degree of security in their interaction with other people and equipment.

Security can be divided into four categories:

authentication, that a claim (especially of an identity) is valid;
 confidentiality, that secrets are only shared by authorised principals;
 integrity, that data cannot be altered in an unauthorised way; and
 availability, that a service or data is always eventually made available to authorised principals.

In order to achieve the required security, it is essential to be able to ensure that the authorised principals can be correctly identified. Thus, authentication is a basic building block of security.

One well-known and widely used electronic means for entity authentication is the PKI or Public Key Infrastructure. A PKI enables users of a basically insecure public network, such as the Internet, to securely and privately exchange data and money through the use of a public and a private cryptographic key pair that is obtained and shared through a trusted authority. The public key infrastructure provides for a digital certificate that can identify an individual or an organization and directory services that can store and, when necessary, revoke the certificates. The use of a PKI entails that one system identifies to another that it wishes to communicate by its long-term unique name.

Whereas in some circumstances, ubiquitous computing applications may behave like traditional ones and have readily available links to trusted third parties and a usable PKI, this will often not be the case. This may be due to the use of these systems in isolated circumstances or simply because of problems with scalability, lack of resources, interoperability, ignorance of the unique process identities on which a PKI depends, or lack of trust. It is therefore important to consider the more difficult case of achieving a degree of security when the entities involved cannot be confident of the others' long-term identities, where there may be no PKI which can validate entities to each other, and where the entities may identify the others they wish to communicate with by some property other than name.

Currently, the de facto standard threat model for analysing security protocols is the Dolev-Yao model, which supposes an intruder who effectively controls a communications network, and is therefore capable of overhearing messages and preventing their delivery to their intended recipient; and—within the limitations of the cryptographic mechanisms involved—of synthesising messages from data initially known to him together with fragments of any previous messages and delivering them, apparently originating from an entity under his control or indeed from any other principal. This model is justifiable for high bandwidth communications channels, such as the Internet. However, it is frequently pessimistic for low bandwidth empirical channels that may exist in addition to standard ones because of, for example, physical contact or proximity.

Consider, for example, that some group of two or more systems has emerged that wish to set up a secure and essentially anonymous network amongst themselves, independently of any central authority. It can be assumed that some empirical communication channels are available between the systems that are not forgeable, these channels being quite low-bandwidth channels. An example is communication between computers mediated by ordinary human conversation amongst their users. However, interaction over these channels can still be assumed to be vulnerable to snooping and perhaps blocking. In the following, an "empirical channel" is a low-bandwidth channel which is not forgeable but which is potentially vulnerable to snooping and blocking. The term "anonymous" used herein is intended to mean that it is not necessary for a node to reveal its long-term name, public key etc.

Thus, it is an object of the present invention to provide a security system for enabling authenticated communication between members of such a group and, optionally, for them to set up a secure, and, if required, anonymous communication network to be set up between them. Authentication and anonymity are not incompatible in this domain because a node can be identified by its context (such as belonging to one of the humans sitting round a table) rather than its long-term name. In a first case it is assumed that all of the members of the group have come to trust each other before the run. In a second case no such assumption is made. In both cases it is required to be guaranteed that the information each trustworthy party wishes to be associated with itself has this origin and integrity authenticated to all other trustworthy parties. Optionally, all trustworthy parties must upon completion of the protocol have sufficient information to enable secure authenticated confidential communication with all other trustworthy parties. All of this is conditional on the existence of a high bandwidth Dolev-Yao network amongst the nodes and non-spoofable, low bandwidth empirical channels between each pair of nodes.

A further object of this invention is to achieve the same goals except that the authentication of other parties' information is required by only a single leader node, and where the empirical channels need only exist to this leader from all others.

In Case 1A, whereby a group of processes, each of which trusts each other and all of which are trustworthy, wishes to achieve secure communication therebetween, security over a normal Dolev-Yao network, such as wireless or the Internet, is required to be guaranteed subject to the existence of the above-mentioned empirical channels between each pair of processes in the group, which empirical channels are mediated by their respective users. The objective here is that each node correctly associates each other node with information that the second node wishes to have associated with it. This will be referred to herein as symmetric security, since each node is authenticated to all others.

In Case 1B, it may be required to form a group consisting of a single leader and a number of other nodes referred to as slaves, where empirical channels may only exist from the other nodes to the leader, in such a way that all these other nodes are authenticated to the leader. Here all nodes are trustworthy. This will be referred to herein as asymmetric security, and could be used, for example, by a user who wishes a hand-held electronic device to connect (e.g. over a relatively insecure wireless network such as Bluetooth®) securely to one or more devices such as a printer and an internet hub.

In Case 2A, it may be required to form a group consisting of a number of nodes, in which a priori some of nodes may not be confident of the trustworthiness of some others. The goal here is that any trustworthy node is authenticated to any other trustworthy node. This will be referred to herein as corruption-tolerant symmetric security since a pair of trustworthy nodes gain mutual security even when one of more corrupt nodes are included in their group.

In Case 2B, it may be required to form a group consisting of a number of nodes consisting of a trustworthy leader and a number of slaves. The goal here is that any trustworthy slave is authenticated to the leader. As in Case 1B, empirical channels are only required from slave nodes to the leader. This will be referred to herein as corruption-tolerant asymmetric security.

In Case 3, it may be required to form a group consisting of a number of nodes consisting of a set L of leaders, which contains at least two members but not the entire group. The goal here is that any two trustworthy members of the group are authenticated to each other on assumption that at least one member of L is trustworthy. This will referred to herein as the hybrid case.

As a part of our implementations of each of the above cases we will require a family of digest functions indexed by some large cryptographic parameter k such that if x#y then, for a given bit-width b of output, the probability that $digest_b(k,x)=digest_b(k,y)$ is as small as possible as k varies. The better behaved this family is, the less likely it is that an intruder can deceive the participants in any of the protocol cases mentioned.

In accordance with the first aspect of the present invention, there is provided a system for verifying the security of communications between a set of trustworthy nodes via a high-bandwidth, insecure communications channel, said system comprising:
 means for enabling one of said nodes, denoted an initiator node, to initiate a run to establish said communications channel and identify itself to the other nodes of said set of nodes;
 means for enabling each of said set of nodes to communicate a single collection of information to all the others including its, perhaps temporary, identity;
 means for enabling said initiator node to devise the means of computing a digest or hash value of all the said information and to communicate sufficient data representative of this means to the other nodes so that they are committed to this digest method but have no means of calculating what it is.
 means for enabling said initiator node to receive data from each of the other nodes of said set of nodes indicating that said data representative of said digest method has been received;
 means for enabling said initiator node to communicate to each node of said set of nodes sufficient information to enable a respective node to compute said digest method;
 means for enabling each of said set of nodes to generate a hash or digest of the data received from all nodes in the first messages, according to the said digest method received from said initiator node, and optionally the number of nodes participating in the run, and means for enabling correspondence between said digests held by each of said set of nodes to be verified via an empirical communication channel, and optionally for confirming that the participant number corresponds to the intended number of participants, and for confirming that said initiator node is among said set of nodes so as to confirm the security of said communications network.

Thus, the information communicated by each participant in the group is authenticated in its origin and contents from the perspective of all members of the group and, optionally, it is guaranteed that there have been no participants other than the intended group. An attacker cannot convince nodes in the group that a communication has come from any member of the group unless it really has.

If the information communicated by each participant contains a public key (with no need for certification by any authority) of which only that participant knows the dual secret key, then the nodes will be in a position to establish secret and authenticated communication with each other.

If the information communicated by each participant contains a Diffie-Hellman token ($g^x$ mod p for a secret x where the large prime p and generator g are common knowledge; one possibility being that they are signalled by the initiator node and then included in each of the participant's information), then any pair of nodes will be able to calculate a shared secret key between them.

In the symmetric case, it is required that all nodes verify that there is correspondence between the digests and participant data, and that the initiator node is among the set of nodes. In the asymmetric case, it is required that the initiator node (i.e. the "leader") verifies these issues.

Also in accordance with the first aspect of the present invention, there is provided a method for verifying the security of a communications network between a set of trustworthy nodes via a high-bandwidth, insecure communications channel, said method comprising:
 causing one of said nodes, denoted an initiator node, to initiate a run to establish said communications channel and identify itself to the other nodes of said set of nodes;
 causing each of said set of nodes to communicate a single collection of information to all the others including its, perhaps temporary, identity;
 causing said initiator node to devise the means of computing a digest or hash value of all the said information and to communicate sufficient data representative of this means to the other nodes so that they are committed to this digest method but have no means of calculating what it is.
 causing said initiator node to receive data from each of the other nodes of said set of nodes indicating that said data representative of said means has been received;
 causing said initiator node to communicate to each node of said set of nodes sufficient information to enable a respective node to compute said means;
 causing each of said set of nodes to generate a hash or digest of the data received from all nodes in the first messages, using the said digest method received from said initiator node, and optionally the number of nodes participating in the run, and causing correspondence between said digests held by each of said set of nodes to be verified via an empirical communication channel, and optionally confirming that the participant number corresponds to the intended number of participants, and confirming that said initiator node is among said set of nodes so as to confirm the security of said communications network.

In accordance with the second aspect of the present invention, there is also provided a system for verifying the security of communications between a set of nodes via a high-bandwidth, insecure communications channel, said system comprising:

means for enabling each of said set of nodes to communicate a single collection of information to all the others including its, perhaps temporary, identity;

means for enabling each node to influence a digest method and of committing each node to this influence without these other nodes being able to constructively deduce what the said influence is;

means for each node, once it has become committed to the influences of all other nodes, to communicate to each node sufficient information to enable these other nodes to determine its influence on the digest method;

means for each node, once it has received all of this information, to generate the final digest based on all initial information and the influences of all nodes, and optionally the number of nodes participating in the run;

means for enabling correspondence between said digest values held by each of said set of nodes to be verified via an empirical communication channel and optionally for the nodes to check that the expected number of nodes are present in the run.

This system comprises the corruption-tolerant cases.

Thus, the information communicated by each trustworthy participant in the group is authenticated to its identity from the perspective of all trustworthy members of the group and, optionally, it is guaranteed that there have been no participants other than the intended group. An attacker cannot convince nodes in the group that a communication has come from any trustworthy member of the group unless it really has.

If the information communicated by each participant contains a public key (with no need for certification by any authority) of which only that participant knows the dual secret key, then the trustworthy nodes will be in a position to establish secret and authenticated communication with each other.

If the information communicated by each participant contains a Diffie-Hellman token ($g^x$ mod p for a secret x where the large prime p and generator g are common knowledge, possibly communicated in an initial message and included in each of the nodes' information), then any pair of trustworthy nodes will be able to calculate a shared secret key between them.

In the symmetric corruption-tolerant case, it is required that all nodes verify that there is correspondence between the digests and optionally the number of participants. In the asymmetric corruption-tolerant case, it is required that a single node (i.e. the "leader") verifies these things.

Also in accordance with the second aspect of the present invention, there is also provided a method for verifying the security of communications between a set of nodes via a high-bandwidth, insecure communications channel, said method comprising:

causing each of said set of nodes to communicate a single collection of information to all the others including its, perhaps temporary, identity;

causing each node to influence a digest method and to commit each node to this influence without these other nodes being able to deduce constructively what the said influence is;

causing each node, once it has become committed to the influences of all other nodes, to communicate to each node sufficient information to enable these other nodes to determine its influence on the digest method;

causing each node, once it has received all of this information, to generate the final digest based on all initial information and the influences of all nodes, and optionally the number of nodes participating in the run;

causing correspondence between said digest values held by each of said set of nodes to be verified via an empirical communication channel and optionally causing the nodes to check that the expected number of nodes are present in the run.

In accordance with the third aspect of the present invention, there is also provided a system for verifying the security of communications between a set of nodes via a high-bandwidth, insecure communications channel based on a non-empty set L of leader nodes whose size is at least 2, said system comprising:

means for enabling each of said set of nodes to communicate a single collection of information to all the others including its, perhaps temporary, identity;

means for enabling each leader node to influence a final digest method and of committing each node to this influence without these other nodes being able to deduce constructively what the said influence is;

means for each node to indicate to the leader nodes that it has received such an influence from every leader node means for each leader node, once it is aware that all other nodes are committed to its influence, to communicate to each node sufficient information to enable these other nodes to determine its influence on the final digest method;

means for each node, once it has received all of this information, to generate the final digest based on all initial information using the influences of all leader nodes, and optionally generate the number of nodes participating in the run;

means for enabling correspondence between said digest values held by each of said set of nodes to be verified via an empirical communication channel and optionally for the nodes to check that the expected number of nodes are present in the run.

This system comprises the hybrid case. In the following it is assumed that L contains at least one trustworthy node.

Thus, the information communicated by each trustworthy participant in the group is authenticated to its identity from the perspective of all trustworthy members of the group. An attacker cannot convince nodes in the group that a communication has come from any trustworthy member of the group unless it really has.

If the information communicated by each participant contains a Diffie-Helhnan token ($g^x$ mod p for a secret x where the large prime p and generator g are common knowledge, possibly communicated by a node in an initial message and included in each node's information for coherence checking), then any pair of trustworthy nodes will be able to calculate a shared secret key between them.

In accordance with the present invention, there is also provided a method for verifying the security of communications between a set of nodes via a high-bandwidth, insecure communications channel based on a non-empty set L of leader nodes whose size is at least 2, said method comprising:

causing each of said set of nodes to communicate a single collection of information to all the others including its, perhaps temporary, identity;

causing each leader node to influence a final digest method and of committing each node to this influence without these other nodes being able to constructively deduce what the said influence is;

causing each node to indicate to the leader nodes that it has received such an influence from every leader node causing each leader node, once it is aware that all other nodes are committed to its influence, to communicate to each node sufficient information to enable these other nodes to determine its influence on the final digest method;

causing each node, once it has received all of this information, to generate the final digest based on all initial information using the influences of all leader nodes, and optionally generate the number of nodes participating in the run;

causing correspondence between said digest values held by each of said set of nodes to be verified via an empirical communication channel and optionally causing the nodes to check that the expected number of nodes are present in the run.

It is a further object of the present invention to provide a security system for enabling a secure and, optionally, anonymous communication network to be set up between a group of two or more devices or systems, whereby privacy even at the high-bandwidth channel level is ensured. In a first case, whereby a group of processes wishes to achieve a secure link therebetween, security over a normal Dolev-Yao network, such as wireless or the Internet, is required to be guaranteed subject to the existence of the above-mentioned empirical channels between each pair of processes in the group, which empirical channels are mediated by their respective users: the identities of the processes for which secure Dolev-Yao communication is achieved must be precisely those connected by a set of empirical channels that they select.

This will be referred to herein as symmetric security, since each node is authenticated to all others.

In a second case, it may be required to form a group consisting of a single leader and a number of other nodes, where empirical channels may only exist from the other nodes to the leader, in such a way that all these other nodes are authenticated to the leader. This will be referred to herein as asymmetric security, and could be used, for example, by a user who wishes a hand-held electronic device to connect (e.g. over a relatively insecure wireless network such as Bluetooth®) securely to one or more devices such as a printer and an internet hub.

In accordance with a further aspect of the present invention, there is provided a system for verifying the security of a communications network between a set of nodes via a high-bandwidth, insecure communications channel, said system comprising:

means for enabling one of said nodes, denoted an initiator node, to initiate a run to establish said communications channel and identify itself to the other nodes of said set of nodes;

means for enabling each of said set of nodes to communicate at least a public key and a piece of information unique to said run to the other nodes of said set of nodes;

means for enabling said initiator node to obtain a first hash or digest value unknown to each of the other nodes of said set of nodes and transmitting data representative of said hash or digest value to each of the other nodes of said set of nodes, said hash or digest value being influenced by said unique information communicated by each of said set of nodes;

means for enabling said initiator node to receive data from each of the other nodes of said set of nodes indicating that said data representative of said hash or digest value has been received;

means for enabling said initiation node to securely communicate to each node of said set of nodes sufficient information to enable a respective node to compute said hash or digest value;

means for enabling each of said set of nodes to generate a hash value from said information received from said initiator node, and means for enabling each of said set of nodes to obtain participant data representative of the number of nodes in said set of nodes, and means for enabling correspondence between said hash values and participant data held by each of said set of nodes to be verified via an empirical communication channel, and for confirming that said initiator node is among said set of nodes so as to confirm the security of said communications network.

Thus, the security of the group is ensured and a shared secret can be obtained from the secret information communicated during the run.

A common secret key is achieved between systems communicating over the Dolev-Yao network, such that privacy and authentication is achieved. An attacker cannot confuse nodes in the group that a communication has come from another one of them when it has not, and cannot understand the messages that pass between members of the group. Here, the group is defined by the set of nodes which have used empirical channels to communicate in the above protocol.

In the symmetric case, it is required that all nodes verify that there is correspondence between the hash values and participant data, and that the initiator node is among the set of nodes. In the asymmetric case, it is required that the initiator node (i.e. the "leader") verifies these issues.

Also in accordance with this further aspect of the present invention, there is provided a method for verifying the security of a communications network between a set of nodes via a high-bandwidth, insecure communications channel, said method comprising:

causing one of said nodes, denoted an initiator node, to initiate a run to establish said communications channel and identify itself to the other nodes of said set of nodes;

causing each of said set of nodes to communicate at least a public key and a piece of information unique to said run to the other nodes of said set of nodes;

causing said initiator node to obtain a first hash or digest value unknown to each of the other nodes of said set of nodes, and transmit data representative of said hash value to each of the other nodes of said set of nodes, said hash or digest value being influenced by such unique information communicated by each of said set of nodes;

causing said initiator node to receive data from each of the other nodes of said set of nodes indicating that said data representative of said hash or digest value has been received;

causing said initiator node to securely communicate to each node of said set of nodes sufficient information to enable a respective node to compute said hash or digest value;

causing each of said set of nodes to generate a hash or digest value from said information received from said initiator node, and causing each of said set of nodes to obtain participant data representative of the number of nodes in said set of nodes; and verifying via an empirical communication channel correspondence between said hash or digest values and participant data held by each of said set of nodes and confirming that said initiator node is among said set of nodes, so as to confirm the security of said communications network.

In all communication over the Dolev-Yao network (but not necessarily the empirical channels), cryptographically generated values must be sufficiently long so as to make the probability of decryption and similar by an attacker without the relevant key etc. negligible, as should be the probability of it being able to create identical values using the "birthday attack" or similar.

In one exemplary embodiment, a hash key is encrypted using the respective public key of the node to which it is to be transmitted, prior to transmission thereof to said respective node. Beneficially, each of said set of nodes additionally enables information representative of said identification data received from an initiator node to be compared with corresponding information held by the others of said set of nodes to verify the identity of the initiator node.

The system beneficially further comprises means for enabling a shared secret, possibly the above-mentioned hash key, to be transmitted from said initiator to the other nodes of said set of nodes after verification that said hash values and participant data correspond, said shared secret forming the basis of a common secret key for use in communication between said set of nodes across said communications network.

In a preferred embodiment of any of the above-mentioned aspects of the invention, a digest value may be used that is generated using a model of a digest function wherein each output bit of digest $(k,x)$ is influenced with a probability of $\frac{1}{2}$ by each of the bits x, all choices being made independently in a way determined by k. This is the ideal implementation of the digest function model. In other words as the key varies, all the probability $\frac{1}{2}$ influences are independent in the sense of probability theory. Prior art systems use big hashes of very large pieces of data, whereas in the following exemplary embodiments of the invention, a short hash of a very large piece of data is used, together with one or more big hashes of small pieces of data. Thus, it becomes possible to use a relatively short hash function with at least the same, if not greater, degree of security relative to prior art systems, which obviously has processing capacity implications, as well as improved accuracy and speed and increased ease and convenience of use.

In a practical hardware implementation implemented, inter alia by, for example, shift registers, the full independence required above by the ideal implementation may be replaced by pseudo-random numbers seeded by k, thereby allowing a much shorter k.

In a practical software (microprocessor) implementation it will be shown below how, by using integer multiplications, it is possible to achieve an effect close to the ideal model when processing half or full words rather than individual bits.

In fact, the present invention extends to a method of generating a digest value (k, D) (and a system for implementing such method), given input data D with length B bits and a uniformly distributed random key k with length at least $b*B$ bits, the method comprising:

deriving $b*B$ independent uniformly distributed bits from k, organised into b partitions of size B;

calculating one bit of the digest value from each of the said partitions, namely the conjunctions of every bit from D with the respective bit of the partition being used (preferably by forming the exclusive-or of B bits); and forming the digest value as the juxtaposition of all b of the bits.

In an alternative embodiment (the "hardware implementation"), the $b*B$ independent bits based on k are replaced by $b*B$ bits generated by a (good quality) pseudo-random number generator seeded by a shorter k.

Thus, also in accordance with the present invention, there is provided a method of generating as digest value (k,D) (and a system for implementing such method), wherein $r=m*b$ is a multiple of the desired output length b of said digest value; the method comprising:

generating in a register R on designated clock cycles, (B/m)+b pseudo-random numbers each of length r, seeded by a uniformly distributed random key k;

initialising a shift register S with length r to a standard value (e.g. 0);

initialising an accumulator register A with length r to a standard value (e.g. 0);

on each designated clock cycle, shifting the shift register s by m bits until all of D has passed through the shift register S (after B/m)+b cycles);

on each designated clock cycle, replacing the accumulator register A with a value representative of a previous value thereof combined with the respective values in the register R and the shift register S (preferably the previous value of accumulator register A is bitwise-exclusive-or-ed with the bitwise-and of the register R and the shift register S to derive the new value to replace the current value in accumulator register A);

after (B/m)+b cycles are completed, partitioning the accumulator register A into b groups of m consecutive bits;

combining (preferably by exclusive-or-ing) the bits of each of said b groups to a single bit; and using the juxtaposition of said b bits to generate said digest value.

Beneficially, said pseudo-random numbers are generated using a feedback shift register.

A "software implementation" of the digest value generation system, depends on the existence, in some implementing microprocessor or other system, of an efficient integer multiplication algorithm that produces the exact answer (in a register of 2c bits) of the multiplication of 2 c-bit numbers for some c greater than or equal to b. 32-bit microprocessors should have this for b at least 16, and 64-bit ones for b at least 32. In the following, a c-bit block will be referred to as a half-word, and a 2c bit block as a word or full-word, but this is not intended to exclude implementations where these components do not correspond to the usual word-length of the system in question.

Thus, in accordance with the present invention, there is provided a method of generating a digest value (k,D) (and a system for implementing such method), where D is input data and k is a uniformly distributed random key k, the method comprising:

generating successive pseudo-random half-words, seeded by k, and partitioning D into half-word blocks;

initialising a full-word accumulator A to a standard value (e.g. 0);

for each half-word block of D, calculating a value which is the integer product of said half-word and a new half-word pseudo random number;

for each half-word block of D, replacing the value of said accumulator A with its previous value combined (preferably by exclusive-or-ing) with the full-word result of said calculated value;

when the preceding steps have been completed for all of D, partitioning accumulator A into first and second parts of c bits each;

and calculating said digest value by combining (preferably by exclusive-or-ing) said first and second parts of said accumulator A. (It will be appreciated that if c=b, then this is the digest, otherwise the first b bits of it form the digest value).

Optionally, following said value calculation step, the value may be exclusive-or-ed with other full-word functions of said half-word and further, possibly half-word, pseudo-random numbers. This and the preceding step define the calculations of the contribution of the respective half-word of D to the accumulator A.

These and other aspects of the present invention will be apparent from, and elucidated with reference to, the embodiments described herein.

Embodiments of the present invention will now be described by way of examples only and with reference to the accompanying drawings, in which:

FIG. 1 is a schematic flow diagram illustrating the principal steps of a protocol for use in a system according to a first exemplary embodiment of the present invention;

FIG. 2 is a schematic flow diagram illustrating the principal steps of a protocol for use in a system according to a second exemplary embodiment of the present invention;

FIG. 3 is a schematic flow design illustrating the principal steps of a protocol for use in a system according to a third exemplary embodiment of the present invention;

FIG. 4 is a schematic diagram illustrating a hardware implementation of digest generation for use in an exemplary embodiment of the present invention.

PROTOCOLS

For the purposes of the following specific description, a group G of devices attempting to achieve a secure link therebetween is assumed, using empirical channels that are mediated by their respective users. This scenario is termed herein the "symmetric" case.

A protocol that has been proposed for this purpose is, in standard notation:

1. Each A $A \rightarrow_N$ Every B :A, kc(A), $N_A$

Thus, each node A, that wishes to set up a secure link between itself and one or more nodes B, sends to each B a Message 1 over the normal Dolev-Yao network (where all messages are subject to overhearing, taking out and faking). Message 1 consists, in combination, of a name for A, kc(A) which is some kind of key certificate for A (and may, in many circumstances, simply be a public key), and a nonce generated by A (which is a randomly chosen value, different from previous choices.

2. Each A $A \rightarrow_N$ Each B :{all Message 1's $N'_A\}_{pk(B)}$

Each recipient node A of the Message is adds its own nonce $N'_A$ and encrypts the resultant Message 2 under the public key for the intended recipient B, before sending it to each respective other node B in the group G. Here, the boundary between Message 1 and Message 2 is determined by some means, such as a time-out.

3a. Each A A displays :hash({all decrypted Message 2's}), number of active participants Each recipient node A of Message 2 decrypts the received message using their own public key, generates a one-way hash value of the decrypted Message 2 and displays this value together with the number of active participants believed to be present in the group.

Thus, once Messages 1 and 2 have been exchanged, each node has a strong indication that all of them agree on the sets of participants and public keys. It also has two nonces from each participant, one which is public and one that is apparently secret. At this stage, there is no way of knowing that the participants in a particular A's session are actually the set G of agents with which A has an empirical communication channel. Thus:

3b. Each A $A \rightarrow_E$ Each B :Users compare hashes and check numbers on screen Each user can be confident, under perfect cryptography, that anyone else with the same hash value agrees on the sets of all Messages 1 and 2, so if everyone agrees on this value then all of them are in the session. There is nothing at this stage, however, that stops an extra participant being present that the devices are all aware of but the humans are not. This, of course, may be an intruder and it is for this reason that the devices display the number of participants as well as the hash values, so that the humans can verify that it is the actual size of G. The checking of Message 3 ensures that N participants are in the same group of size N. They can validly deduce that they are the only participants and that all new nonces sent in Message 2's make up a shared secret between them.

4. Each A $A \rightarrow_N$ Each B :hash'({all decrypted Message 2's})

Message 4 in this protocol simply represents the devices performing an additional round of agreements amongst themselves prompted by their users pressing "OK" after Message 3. It is not necessary to include all of the Message 2 bodies in the hash; the set of the various $N'_A$ values should suffice.

In general, therefore, having a shared secret (the $\{N'_a|a \in G\}$) allows the devices of the group members to communicate securely: they can use it to generate the session key. Unlike human conversation, the contents of the encrypted messages cannot be understood by any intruder.

Thus, the above-described protocol seems to bootstrap security very well. However, it has one significant disadvantage. Imagine the human users comparing their hash values (step 3b). Assuming they are typically impatient, they are not likely to want to handle more than a few characters. Thus, the hash length that is likely to be able to be used may be vulnerable to a combinatorial attack as long as an intruder (in the guise of C) can try many $N_C$'s so as to get a particular value in Message 3 above. Unfortunately, with the above-described protocol, he can do just that. There is a combinatorial attack which involves partitioning a group G of N who want to form a single session into two non-empty subsets $S_1$ and $S_2$ with the intruder engaging in a separate session with each. For each, it uses exactly the right number of identities to expand the subset to size N, in each case using identities for which it has the secret keys. The two runs of the protocol act in parallel, with the intruder manipulating the Dolev-Yao network so that only the messages within each subset get through.

In each case, the intruder runs Message 1 with the appropriate group $S_i$ and waits for all the nodes in G to contribute their Message 2's to the two runs. It then must invent N different nonces $N'_A$ to transmit its Message 2's. Using whatever time it has, it can search for combinations of values which make the two hash values in Message 3 the same, bearing in mind that it has all the information to compute these hashes for any choice he may make of nonces. Note that since the intruder can work with the two hashes at once, it can expect to get a coincidence if it creates just over the square root of hashes on each side, due to the well known "birthday paradox". For example, for a hash consisting of six digits (i.e. 1,000,000 possible values), only about three thousand hashes must be computed for the intruder to have a 90% chance of success. If it succeeds in doing so, the intruder transmits the appropriate Message 2's to the respective members of $S_1$ and $S_2$.

Upon reaching Message 3, the humans (from the two groups combined) will then see identical hashes and correct counts displayed on their devices, and so will agree to proceed beyond Message 3. The intruder then just has to manipulate the network for Message 4 and contribute the correct final message in each of the two sessions. This leaves the intruder with apparently authenticated connections to the two subgroups, including knowledge of all the secrets arising from the runs. Thus, for example, the intruder taking one identity could hijack an attempt to run the above-mentioned protocol between two users. While one would normally increase the size of the hash to avoid this type of attack to any chosen probability, the presence of and requirement for human interaction in the loop, limits this option as a realistic probability and introduces a definite weakness in the protocol.

Thus, the present invention proposes protocols to counter the type of combinatorial attack described above, which rely on fixing the hash value (hereinafter referred to as a 'digest value') in such a way that each node will be able to tell if it has been manipulated before any potential attacker is in a position to do a combinatorial search. In other words, the users become committed to the digest value at a stage where no potential intruder could know, or search for ways of constructively manipulating, this value.

A protocol used in an exemplary embodiment of the symmetric and asymmetric cases of the first aspect of the present invention will now be described, wherein it is assumed that the digest functions have a key such that, for each choice of key, they represent separate hash functions, and a distinction is made between digest(hk, m) and longhash(m). The first of these is what the humans compare, the second has enough bits to defeat any combinatorial attack. In the longhash case, it should be infeasible to compute m from the values (or indeed any number of hashes in which one or other is fixed and the other is varying) in any reasonable time. In the digest case, the probability as hk varies and m and m' are fixed and distinct that digest(hk,m)=digest(hk,m') is less than the acceptable probability of an attack succeeding.

A special role is given to one of the members of G, who initiates the protocol and who makes all of the members of the group aware that he is playing this role. All members of G know by the end that one of their number has initiated the respective run of the protocol, that precisely the members of G have been involved in it, and secret information which they know is shared precisely by the members of G.

Referring to FIG. 1 of the drawings, the protocol used by a first exemplary embodiment, of the symmetric and asymmetric cases of the first aspect, of the present invention is as follows, noting that if the nodes do not wish to reveal their long-term identities they may use temporary ones instead. The following, with the two variations on Message 4b specified below, works for both the symmetric and asymmetric cases 0. I→$_N$Each A :I The initiating node transmits to each node their identity I, across the Dolev-Yao network N. In the asymmetric case referred to above, the initiating node is always the "leader".

1. Each A A→$_N$Each B :A,INFO$_A$

Thus, as before, each node A, that wishes to set up a secure link between itself and one or more nodes B, sends to each B a Message 1 over the normal Dolev-Yao network (where all messages are subject to overhearing, taking out and faking). Message 1 consists, in combination, of a name for A, and a set of information INFO$_A$ that A wishes to have associated with it. In many cases INFO$_A$ will include either a public key or a Diffie-Hellman token, and contextual information such as the name of the user of the node.

2. I→$_N$Each A :longhash(hk)

I invents a new hash key hk. It then sends each node a long hash (substantially immune to an attack due to the birthday paradox referred to above) of these values. On the basis of this information, no node, other than I, knows the value of hk, but no node that has accepted the message from/will be able to be fooled into thinking any other value of hk is correct.

2b.

This step provides some way of ensuring that I will not send a Message 3 while any other node or agent in G is still waiting for a Message 2. The most obvious way of doing this is to use the empirical channel at this point to inform I that all others are committed. For example, when a node A has received Message 2 it might display an indication on its screen, and its user might inform the user of I. However, other means of achieving this assurance are envisaged, and the present invention is not necessarily intended to be limited in this regard. Furthermore, it may also be desirable to include a preliminary test of the probable coherence of a run of the protocol in advance of any comprehensive authentication, which may protect the users against avoidable effort. This preliminary test may comprise a Message 2a in which all nodes broadcast a public hash of the Message 1's.

3. I→$_N$Each A :hk

In this step, the initiator I sends each node the hash key hk across the Dolev-Yao network under its own respective public key. At this point, each node can check the value of hk by testing to see if it produces the correct value for Message 2 and they only proceed if this is true. An intruder is so unlikely to be able to send a value of hk, that would lead to the same Message 2, such that each node really can be assured that the hk it receives was used at step 2 provided and of course, that it yields the correct value for Message 2.

Optionally, this message can be encrypted under any device contained in the INFO$_A$s to enable secure communication from I to the other As. This might be A's public key or the shared key developed from A's and I's Diffie-Hellman tokens.

4a. Each A A displays :digest(hk, all Messages 1), init(I, A), (number of participants, optionally)

Each recipient node A of Message 1 generates a digest value of the values received as Message 1s, influenced by the value hk, and displays this value together, optionally, with the number of active participants believed to be present in the group. In addition in the symmetric case, init(I, A) is displayed, which gives information about the initiator. While this information may take many forms, the only information that really needs to be displayed here is information to each user as to whether their device is the initiator of the session.

4b. Each A A→$_E$Each B :Users compare information

The members of G compare the displayed digests and check the apparent number of participants (via a low-bandwidth, empirical communications channel), as in the previously described protocol. The difference in this case is that one of them must be able to confirm that they are in fact the initiator. If these checks fail, the run is abandoned. It will be appreciated that, in the asymmetric case, it is only necessary that all the subsidiary nodes communicate their values from step 4a to the leader, who compares them.

Each implementation should ensure that the commitment deduced by the initiator I in Message 2b does not relate to an earlier run by another node A. In other words, in Message 4, A should be committed to the same hash key hk that I saw it committed to. This property will naturally hold in many human-mediated symmetric implementations, provided these users follow natural rules. In other implementations it may be necessary or desirable to enforce it via, for example, timing constraints or further empirical communications.

The protocol described above is termed the Hash Commitment Before Knowledge (HCBK) protocol because of the principle on which it works. The asymmetric variant is termed the Asymmetric Hash Commitment Before Knowledge (AHCBK) protocol.

The HCBK and AHCBK protocols can be analysed as follows:

1. After Message 4, all participants know that I, one of their number (and therefore trustworthy) has generated a value hk and that the value they have just agreed to (created using their various views of hk) all coincide with I's own. Under the same strong assumptions of perfect cryptography mentioned above in relation to the first-described protocol, this would prove that the $INFO_A$ associated to each node is correct, since certainly A itself will not include an incorrect value for $INFO_A$. Furthermore, if the participant count is implemented, they know that there is no further node present since every one of them is, and there is therefore no room left in the count for any others. (However, as discussed, it is unreasonable to make such an assumption for the digest value.)
2. Before Message 3 is sent, all members of G have a long hash which has apparently been computed using hk, but I has not divulged hk itself to anyone. Of course, an intruder may have sent any of the Message 2's, but he has no way of knowing at this stage what the digest value computed in Message 4 will be. Therefore, there is no constructive way in which an intruder can manipulate the Message 2's for his own purposes.
3. Since it is computationally infeasible for the intruder to find other inputs for which a long hash comes up with a given answer, the fact that a member of G gets past Message 3 means that they have the same view of hk as whoever generated the Message 2 they accepted.
4. At the point at which a device A accepts a Message 2, the digest value it generates in Message 4 is completely determined; however, no entity other than the sender of Message 2 (apparently I) is in a position to compute that value yet.
5. Supposing that A has agreed the digest value DV in Message 4 with that of I, there are two possibilities:
   It is part of the same run on the same data as I, so all is well;
   It is part of a different run that happens to have the same digest value. However, for this to be true, the intruder must have fixed another run to have I's value DV in advance of knowing what DV is. This can only be done via a single guess, which can be assumed to have negligible probability of success thanks to the properties of digest described above and specified in more detail in the section devoted to that function below. It cannot be multiplied by attacking several members of G since as soon as one of them spots a discrepancy, the run will be abandoned.
6. If Message 3 is sent encrypted using a reliable method of cryptography set up by the Messages 1, then the fact that the $INFO_A$s are authenticated to the members of the group means that hk is a shared secret.

A protocol used in a second exemplary embodiment of the present invention will now be described, wherein it is assumed that functions digest(h,m) and longhash(m) exist with the same properties as described above. This illustrates the second, corruption-tolerant, aspect of the invention.

Referring to FIG. 2 of the drawings, the protocol used by an exemplary embodiment of the symmetric and asymmetric corruption-tolerant cases of the present invention is as follows, noting that if the nodes do not wish to reveal their long-term identities they may use temporary ones instead. The following, with the two variations on Message 4b specified below, works for both the symmetric and asymmetric corruption-tolerant cases 1. Each A A→$_N$Each B :A,$INFO_A$ Thus, as before, each node A, that wishes to set up a secure link between itself and one or more nodes B, sends to each B a Message 1 over the normal Dolev-Yao network (where all messages are subject to overhearing, blocking and forging). Message 1 consists, in combination, of a name for A, and a set of information $INFO_A$ that A wishes to have associated with it. In many cases $INFO_A$ will include either a public key or a Diffie-Hellman token, and contextual information such as the name of the user of the node.

2. Each A→$_N$Each B :longhash(A,$hk_A$)

Each A invents a new hash key $hk_A$. It then sends every other node a long hash (substantially immune to an attack due to the birthday paradox referred to above) of this value. The name A is included in this hash to prevent any other node using the value $hk_A$ as its own hash key by simply copying A's Message 2. As an alternative to this, the nodes can simply send longhash($hk_A$) is no node A accepts the same value of Message 2 from any participant that is the same as A has previously sent. In either case, on the basis of this information, no node, other than A, knows the value of $hk_A$, but no node that has accepted the message from A will be able to be fooled into thinking any other value of $hk_A$ is correct. The protocol could equally be designed with Messages 1 and 2 combined into one.

3. Each A→$_N$ Each B :$hk_A$

In this step, the initiator I sends each node the hash key $hk_A$ across the Dolev-Yao network under its own respective public key. At this point, each node can check the value of hk by testing to see if it produces the correct value for Message 2 and they only proceed if this is true. An intruder is so unlikely to be able to send a value of $hk_A$, that would read to the same Message 2, such that each node really can be assured that the hk it receives was used at step 2 provided, and of course, that it yields the correct value for Message 2.

4a. Each A A displays :digest (hk*, all Messages 1), (number of participants, optionally)

Here, hk* is the bitwise exclusive-OR of all the $hk_B$'s transmitted by members of the group. Each recipient node B of Message 1 generates a digest value of the values received as Message 1s, influenced by the value hk*, and displays this value together, optionally, with the number of active participants believed to be present in the group.

4b. Each A A→$_E$ Each B :Users compare information

The members of G compare the displayed digests and check the apparent number of participants (via a low-bandwidth, empirical communications channel), as in the previously described protocol. If these checks fail, the run is abandoned. It will be appreciated that, in the asymmetric case, it is only necessary that all the subsidiary nodes communicate their values from step 4a to the leader, who compares them.

The above-described embodiment may be termed the 'Symmetrised Hash Commitment Before Knowledge (SHCBK) protocol', because the special role of the initiator above-described first exemplary embodiment has been removed.

The SHCBK protocol can be analysed as follows: suppose that A and B are both trustworthy members of the group.

1. After Message 4, each of A and B know that the two of them have agreed the digest value. If this implied that the antecedents of the digests were identical then it would imply that the two nodes agreed on $INFO_A$ and $INFO_B$, and that therefore each of them has the correct information about the other. However, as before, this is not necessarily a reasonable assumption so we must analyse how an intruder might have got them to agree the digests of two different sets of antecedents.
2. Before A sends its Message 3, it knows that it is committed to a final digest value that no other party knows, since no other party knows $hk_A$, which is essential to the computation of its value.
3. It follows that A's data cannot have been constructively altered by an intruder so that its final digest will agree with B's as this is impossible without knowledge of hk* and therefore $hk_A$.
4. Since the previous two steps are equally true of B's digest, it follows that any attempt by an intruder to get A and B to agree digest values for different sets of antecedents can succeed with no higher chance than 1/H, where H is the number of digest values if the digest function is "perfect", or at least (according to our definition of digest) acceptably small.

Referring to FIG. 3 of the drawings, the protocol used by a third exemplary embodiment of the present invention is as follows, noting that if the nodes do not wish to reveal their long-term identities they may use temporary ones instead. This illustrates the third, hybrid, aspect of the invention.

0. I→$_N$Each A :L

The initiating node transmits to each node a set of identities, across the Dolev-Yao network N. These "leaders" will have the duty of each sending a committing value to the group. Note this message simply represents the fact that it may be desirable or necessary for some or all nodes (especially the leaders themselves!) to know which of them is playing this role. This is simply one example method, in the case that some I knows the identities of the members of L.

1. Each A A→$_N$Each B :A,$INFO_A$

Thus, as before, each node A, that wishes to set up a secure link between itself and one or more nodes B, sends to each B a Message 1 over the normal Dolev-Yao network (where all messages are subject to overhearing, taking out and faking). Message 1 consists, in combination, of a name for A, and a set of information $INFO_A$ that A wishes to have associated with it. In many cases $INFO_A$ will include either a public key or a Diffie-Hellman token, and contextual information such as the name of the user of the node.

Each C→Each A: longhash(C,$hk_C$)

Each leader C invents a new hash key $hk_C$. It then sends each node a long hash (substantially immune to an attack due to the birthday paradox referred to above) of these values. Again the name C is included to prevent the long hash being forwarded as its own by an untrustworthy node, and again there is the option of each C checking it is not sent its own hash back. On the basis of this information, no node, other than C, knows the value of $hk_C$, but no node that has accepted the message from C will be able to be fooled into thinking any other value of $hk_C$ is correct.

2b.

This step provides some way of ensuring that no leader C will send a Message 3 while any other node or agent in G is still waiting for a Message 2. The most obvious way of doing this is to use the empirical channel at this point to inform the leaders that all others are committed. For example, when a node A has received Message 2 it might display an indication on its screen, and its user might inform the users of the leaders C. However, other means of achieving this assurance are envisaged, and the present invention is not necessarily intended to be limited in this regard. Furthermore, it may also be desirable to include a preliminary test of the probable coherence of a run of the protocol in advance of any comprehensive authentication, which may protect the users against avoidable effort. This preliminary test may comprise a Message 2a in which all nodes broadcast a public hash of the Message 1's.

3. Each C→$_N$Each A :$hk_C$

In this step, the leaders C sends each node the hash keys $hk_C$ across the Dolev-Yao network under its own respective public key. At this point, each node can check the value of $hk_C$ by testing to see if it produces the correct value for the corresponding Message 2 and they only proceed if this is true. An intruder is so unlikely to be able to send a value of $hk_C$, that would read to the same Message 2, such that each node really can be assured that the $hk_C$s it receives were used at step 2 provided, and of course, that they yield the correct values for Message 2.

4a. Each A A displays :digest(hk*, all Messages 1), leader(L, A), (number of participants, optionally) where hk* is the bitwise exclusive OR of all the $hk_C$ Each recipient node A of Message 1 generates a digest value of the values received as Message 1s, influenced by the value hk*, and displays this value together, optionally, with the number of active participants believed to be present in the group. In addition the value leader(L, A) is displayed, which sets out information about the leaders for the users to see.

4b. Each A→$_E$Each B :Users compare information

The members of G compare the displayed digests and check the apparent number of participants (via a low-bandwidth, empirical communications channel. In this case sufficient nodes must confirm they are leaders that all nodes are confident that they are not all corrupt. If these checks fail, the run is abandoned.

Each implementation should ensure that the commitment deduced by the leaders C in Message 2b does not relate to an earlier run by another node A. In other words, in Message 4, A should be committed to the same hash key $hk_C$ that C saw it committed to. The issues of how to enforce this are the same as in the earlier protocols to which it applied.

The protocol described above is termed the Hybrid Hash Commitment Before Knowledge (HHCBK) protocol because it applies to the hybrid case and is in effect a hybrid of HCBK and SHCBK.

Provided at least one C in L is trustworthy then if A and B are any two trustworthy nodes who have completed a successful run then each of $INFO_A$ and $INFO_B$ is authenticated to the other node. In summary this is because the influence of $hk_C$ on the final digest cannot be known to any intruder before A, B and C are committed to their final digest values, and because C agrees with A and B on the final value. We know that A and B have been influenced by C because of the agreement on who the members of L are with each other and C itself.

It has been observed that a high-bandwidth Dolev-Yao channel C can be converted into a high-bandwidth unforgeable channel if there is an empirical channel E between the same pair of principals: any communication on C can be accompanied by a hash of the same value on E. We observe here that such use is open to similar combinatorial attacks to the one highlighted earlier, if the hash value is short. The asymmetric protocols described herein can remove this difficulty. Furthermore, it can do so in such a way that it only has to be run once for any number of uses of C, and indeed a single run of the protocol can assure any number of channels from different principals to the same one.

Digest Functions.

The digest functions referred to in this document have much in common with the usual concept of a cryptographic hash: both take an arbitrary-length input and deliver a fixed-length output in a way that is specified to have strong unpredictability properties. There are, however, significant differences:

1. Typically, hash functions have an output length typical of the size of data that a computer can comfortably handle and compare; perhaps several words. At least in the applications envisaged here, the digest functions have an output length that humans can comfortably handle and compare; perhaps as little as two bytes. Achieving the optimal performance of a digest function relative to a particular output length is critical.
2. Hash functions usually have one argument; in our specification a digest function has two: a key which chooses a particular "hash" function and the data of which the digest is being formed.
3. Hash functions are usually specified to have two properties: they must be collision free and non-invertible. Namely, it should be infeasible to find distinct values x and y such that hash(x)=hash(y), and for any value z it should be infeasible to find x such that hash(x)=z. The output length typical of a digest function would make both these goals impossible to achieve even when an attacker has very modest computing resources, but fortunately they are not necessary for our purpose.
4. Our requirement of a digest function is that, for a given output length b, the probability (as k varies and if x≠y are an arbitrary pair of distinct data arguments) that digest(k,x)=digest(k,y) is as small as possible. The smallest probability that can apply uniformly to all x and y is $2^{-b}$.

A good digest function serves the purpose that it makes the likelihood of any attack succeeding against the protocols listed above, even by the most subtle and devious attacker, as small as possible. It will have the same effect in any other application where a group of entities wish to agree a set of data and have a key k available that has not been susceptible to constructive attack.

The following "ideal model" shows how to build a perfect digest function that applies to output of length b and input data x of length up to and including D, where it assumed the representation of x contains sufficient information about its length that extending it to exactly D bits with 0s creates no ambiguity.

1. Make the key k so large that it is possible to construct b*D independent random variables $R_{ij}$ (for i between 1 and b, and j between 1 and D) that are uniformly distributed over {true, false}.
2. Compute the ith bit $d_i$ of digest(h,x) using the formula $d_i = XOR_{j=1,D}(x_j \& Rij)$ where $x_j$ is the jth bit of x.

For any x≠y this precisely achieves: the likelihood that digest(k,x)=digest(k,y) is $2^{-b}$.

While this is implementable given a long k, there are two disadvantages:

The key k would have to be impractically long for most purposes.

The explicit calculation above, at least using a software implementation, may be more expensive than we might like.

For practical purposes it may therefore be necessary to settle for less than this ideal model. This model may however be used to derive approximations to it.

A pseudo-random number generator seeded with a shorter k can be used to create good approximations to the random variables required.

In the case of a hardware implementation a good candidate for this is a feedback shift register seeded with k, or several seeded with parts of k.

If such a register produces r*b pseudo-random bits on each cycle, then the stream of bits representing x can be shifted by r bits on each cycle and a section of length r*b bitwise-and-ed with the current random bits, then XORed into an accumulator (initially 0) that is r*b bits long. The output of the digest function is then the result of XORing each of the b blocks of r consecutive bits of this accumulator together. The implementation described herein is illustrated in FIG. 4.

In the case of a software implementation (i.e. one implemented using the functionality of a microprocessor rather than customised hardware) it is desirable to have a way of letting every bit of the data stream x influence every bit of the output, in a manner akin to the ideal model, while only shifting the input stream efficiently while dealing with that stream in whole or half-word blocks.

One way of achieving this in the case that the desired digest is a half word or less is to use integer multiplication in half-word blocks: suppose that $r_i$ are a series of half-word pseudo-random blocks seeded by k, and that $x_i$ are the half-word blocks of x. Then we observe that in the whole word $r_i * x_i$ each bit of $x_i$ has a direct influence, for each bit $z_j$ of the lower half word of the result, either on $z_j$ or the corresponding bit of the upper half word.

Therefore we can exploit the fast implementation of integer multiplication in most microprocessors by accumulating the sum of all the $r_i * x_i$ and finally forming the XOR of the upper and lower half words of the result.

The same technique will work for whole-word digests provided there is a fast implementation of double-length integer multiplication available.

Aside from use of pseudo random $r_i$, there is another way in which this multiplication model falls short of the ideal. That is, if say a half word is 16 bits, then only the 16 bits of randomness of $r_i$ influences how $x_i$ maps into the 16 bits of the digest output while the ideal model suggests there should be $16^2$. In other words, the analogues of the $R_{ij}$ (from the ideal model) we are using cannot be completely independent. To increase this independence we could additionally add one or more terms of the form $r''_i * (r'_i \& x_i)$ for $r'_I, r''_I$, different series of pseudo-random numbers to our accumulator. This removes the most obvious relationships that exist between the original $R_{ij}$ arising from the fact that the same coefficient of $r_i$ that multiplies $x_j$ in $b_{i+j}$ also multiplies $x_{j+1}$ in $b_{i+j+1}$ (though this effect is significantly blurred by the carry). The number of terms of the form $r''_i * (r'_i \& x_i)$ for $r'_I$ used (if any) represents a trade-off between the efficiency and quality of the digest. The form of the additional terms quoted here is intended as an example: other randomised full word functions of $x_i$ could be used instead.

The above relates to a software implementation of digest and is based on the way integer multiplication can provide a good approximation to the ideal model. However, many other ways besides those illustrated of completing the details of this approximation are anticipated, and the present invention is not necessarily intended to be limited in this regard.

Thus, in summary, three ways of implementing the digests are outlined above:
1. The ideal implementation based on a large k.
2. The hardware implementation based on the ideal one but using pseudo-random numbers (possibly generated by a feedback register) and a shift register, as illustrated schematically in FIG. 4 of the drawings.
3. The software implementation based on the ideal one that exploits the properties of integer multiplication combined with a final combination of the two halves.

In general, this aspect of the present invention comprises the general concept of calculating a digest value comprising integer multiplication combined with the final joining of two halves.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for verifying the security of a communications network between a set of nodes via a high-bandwidth, insecure communications channel, wherein:
one of said nodes, denoted an initiator node, is configured to initiate a run to establish said communications channel and identify itself to the other nodes of said set of nodes;
each of said set of nodes is configured to communicate a single collection of information to all the others including its identity;
said initiator node is further configured to:
compute a digest or hash value of all the information and to communicate sufficient data representative of this to the other nodes thereby establishing a digest method so that the nodes are committed to the digest method but do not calculate the digest or hash value;
receive data from each of the other nodes of said set of nodes indicating that said data representative of said digest method has been received; and
communicate to each node of said set of nodes sufficient information to enable a respective node to compute said digest method; and
each of said set of nodes is further configured to generate a hash or digest of the data received from all nodes in first messages, according to the digest method received from said initiator node,
correspondence between said digests held by each of said set of nodes is verifiable via an empirical communication channel, and
the security of said communications network is confirmable in the event that said initiator node is among said set of nodes.

2. A system according to claim 1, wherein said first message contains a public key in respect of which only the respective node knows the dual secret key or wherein said first message contains a Diffie-Hellman token.

3. A system according to claim 1, wherein each of said set of nodes is configured to generate the number of nodes participating in the run and/or wherein it is confirmable whether the number of participants of said run corresponds with the intended number of participants.

4. A system according to claim 1, wherein only the initiator node is configured to verify that there is correspondence between the hash or digest values.

5. A system according to claim 3, wherein any means of secure communication contained in the first messages, such as public keys or Diffie-Hellman tokens, is used to protect secret information sent by the initiator during the protocol, thereby creating a shared secret.

6. A method for verifying the security of a communications network between a set of nodes via a high-bandwidth, insecure communications channel, wherein:
one of said nodes, denoted an initiator node, is configured to initiate a run to establish said communications channel and identify itself to the other nodes of said set of nodes;
each of said set of nodes is configured to communicate a single collection of information to all the others including its identity;
said initiator node is configured to devise the means of computing a digest or hash value of all the information and to communicate sufficient data representative of this means to the other nodes so that they are committed to this digest method but have no means of calculating what it is via at least one processor;
said initiator node is configured to receive data from each of the other nodes of said set of nodes indicating that said data representative of said means has been received;
said initiator node is configured to communicate to each node of said set of nodes sufficient information to enable a respective node to compute said means;
each of said set of nodes is configured to generate a hash or digest of the data received from all nodes in the first messages, using the digest method received from said initiator node, via the at least one processor, and
correspondence between said digests held by each of said set of nodes verifiable via an empirical communication channel; and
said initiator node is confirmable as being among said set of nodes so as to confirm the security of said communications network.

7. A system for verifying the security of a communications network between a set of nodes via a high-bandwidth, insecure communications channel, wherein:
said set of nodes is configured to communicate a single collection of information to all the others including its identity;
each node is configured to influence a digest method, this influence being committable to each node without these other nodes being able to deduce constructively what the influence is;
each node, once it has become committed to the influences of all other nodes, is further configured to communicate to each node sufficient information to enable these other nodes to determine its influence on the digest method;

each node, once it has received all of this information, is further configured to generate the final digest based on all initial information and the influences of all nodes; and correspondence between said digest values held by each of said set of nodes is verifiable via an empirical communication channel.

8. A system according to claim 7, wherein said first message contains a public key in respect of which only the respective node participant knows the dual secret key or wherein said first message contains a Diffie-Hellman token.

9. A system according to claim 7, wherein each of said set of nodes is further configured to generate the number of nodes participating in the run and/or wherein it is confirmable whether the number of participants of a run corresponds with the intended number of participants.

10. A system according to claim 7, wherein one of said nodes is designatable as an initiator node, which is to become the only node responsible for verifying that there is correspondence between the hash or digest values.

11. A method for verifying the security of a communications network between a set of nodes via a high-bandwidth, insecure communications channel, wherein:
  each of said set of nodes is configured to communicate a single collection of information to all the others including its identity;
  each node is configured to influence a digest method and to commit each node to this influence without these other nodes being able to deduce constructively what the influence is via at least one processor;
  each node, once it has become committed to the influences of all other nodes, is configured to communicate to each node sufficient information to enable these other nodes to determine its influence on the digest method;
  each node, once it has received all of this information, is configured to generate the final digest based on all initial information and the influences of all nodes via the at least one processor; and
  correspondence between said digest values held by each of said set of nodes is verifiable via an empirical communication channel.

12. A system for verifying the security of communications between a set of nodes via a high-bandwidth, insecure communications channel based on a non-empty set L of leader nodes whose size is at least 2, wherein:
  each of said set of nodes is configured to communicate a single collection of information to all the others including its identity;
  each leader node is configured to influence a final digest method, this influence being committable to each node without these other nodes being able to deduce constructively what the influence is;
  each node is configured to indicate to the leader nodes that it has received such an influence from every leader node;
  each leader node, once it is aware that all other nodes are committed to its influence, is further configured to communicate to each node sufficient information to enable these other nodes to determine its influence on the final digest method;
  each node, once it has received all of this information, is further configured to generate the final digest based on all initial information using the influences of all leader nodes; and
  correspondence between said digest values held by each of said set of nodes is verifiable via an empirical communication channel.

13. A system according to claim 12, wherein said first message containing a public key, in respect of which only the respective node knows the dual secret key, or wherein said first message contains a Diffie-Hellman token.

14. A system according to claim 12, further comprising means for enabling each of said set of nodes to generate the number of nodes participating in the run and/or confirming that the number of participants of a run corresponds with the intended number of participants.

15. A method for verifying the security of communications between a set of nodes via a high-bandwidth, insecure communications channel based on a non-empty set L of leader nodes whose size is at least 2, wherein:
  each of said set of nodes is configured to communicate a single collection of information to all the others including its identity;
  each leader node is configured to influence a final digest method and of committing each node to this influence without these other nodes being able to constructively deduce what the influence is via at least one processor;
  each node is configured to indicate to the leader nodes that it has received such an influence from every leader node;
  each leader node, once it is aware that all other nodes are committed to its influence, is configured to communicate to each node sufficient information to enable these other nodes to determine its influence on the final digest method;
  each node, once it has received all of this information, is configured to generate the final digest based on all initial information using the influences of all leader nodes via the at least one processor; and
  correspondence between said digest values held by each of said set of nodes is verifiable via an empirical communication channel.

16. A method of creating a secure communications network between a set of nodes including using a digest function to generate a digest value (k, D) at every node, given input data D with length B bits and a uniformly distributed random key k with length of a typical cryptographic hash function, the method comprising:
  deriving b*B independent uniformly distributed bits from k, organized into b partitions of size B;
  calculating one bit of the digest value from each of the partitions in combination with input data D; and
  forming the digest value as the juxtaposition of all b of the bits.

17. A method according to claim 16, wherein one bit of the digest value is calculated from each of said partitions by forming the exclusive—or of B bits.

18. A system comprising at least one processor configured to execute instructions corresponding to the method of claim 16.

19. A method of generating as digest value (k,D) from a digest function, wherein r=m*b is a multiple of the desired output length b of said digest value, the method comprising:
  generating in a register R on designated clock cycles, (B/m)+b pseudorandom numbers each of length r, seeded by a uniformly distributed random key k;
  initializing a shift register S with length r to a standard value (e.g. 0);
  initializing an accumulator register A with length r to a standard value (e.g. 0);
  on each designated clock cycle, shifting the shift register s by m bits until all of D has passed through the shift register S; and
  on each designated clock cycle, replacing the accumulator register A with a value representative of a previous value thereof combined with the respective values in the register R and the shift register S.

20. A method according to claim 19, wherein the previous value of accumulator register A is bitwise-exclusive-or-ed with the bitwise-and of the register R and the shift register S to derive the new value to replace the current value in accumulator register A;
after (B/m)+b cycles are completed, partitioning the accumulator register A into b groups of m consecutive bits;
combining the bits of each of said b groups to a single bit; and using the juxtaposition of said b bits to generate said digest value.

21. A method according to claim 19, wherein said pseudo-random numbers are generated using a feedback shift register.

22. A method according to claim 19, wherein said combining comprises exclusive-or-ing said bits of each of said b groups to a single bit.

23. A system comprising at least one processor configured to execute instructions corresponding to the method of claim 19.

24. A method of creating a secure communications network between a set of nodes including using a digest function to generate a digest value (k,D) at every node, where D is input data and k is a uniformly distributed random key k, the method comprising:
generating successive pseudo-random half-words, seeded by k, and partitioning D into half-word blocks;
initialising a full-word accumulator A to a standard value;
for each half-word block of D, calculating a value which is the integer product of said half-word and a new half-word pseudo random number;
for each half-word block of D, replacing the value of said accumulator A with its previous value combined with the full-word result of said calculated value;
when the preceding steps have been completed for all of D, partitioning accumulator A into first and second parts of c bits each; and
calculating said digest value by combining said first and second parts of said accumulator A.

25. A method according to claim 24, wherein at least one of said combining steps comprises exclusive-or-ing.

26. A method according to claim 24, wherein following said value calculation step, the value is exclusive-or-ed with other full-word functions of said half-word and further pseudo-random numbers.

27. A system comprising at least one processor configured to execute instructions corresponding to the method according to claim 24.

28. A method according to claim 6, wherein each of said set of nodes is configured to generate the number of nodes participating in the run and/or it is confirmable whether the participant number corresponds to the intended number of participants.

29. A method according to claim 11, wherein each of said set of nodes is configured to generate the number of nodes participating in the run and/or it is confirmable whether the participant number corresponds to the intended number of participants.

30. A method according to claim 15, wherein each of said set of nodes is configured to generate the number of nodes participating in the run and/or it is confirmable whether the participant number corresponds to the intended number of participants.

31. A system according to claim 7, comprising wherein one of said nodes is designatable as an initiator node, which is to become the only node responsible for verifying that there is correspondence between the hash or digest values and the participant data.

32. A method according to claim 16, wherein the length of the typical cryptographic hash function is 160 or 256 bits.

33. A system according to claim 1, wherein the digest value produced are to be compared a digest method.

34. A system according to claim 33, wherein the digest value depends on long hash keys committed by parties and data the parties want to authenticate.

35. A system according to claim 34, wherein the digest value is 16 to 32 bits.

* * * * *